United States Patent [19]

Sigas

[11] 4,182,226
[45] Jan. 8, 1980

[54] NUTCRACKER

[76] Inventor: Costas A. Sigas, 134 SE. 12th Ave., Portland, Oreg. 97214

[21] Appl. No.: 874,574

[22] Filed: Feb. 1, 1978

[51] Int. Cl.² .................. A23N 5/00; A47J 43/26
[52] U.S. Cl. .......................... 99/578; 99/581; 100/199
[58] Field of Search .............. 99/349, 497, 498, 539, 99/568, 571, 572, 577, 578, 581–583; 100/193–195, 266, 292, 293, 199; 30/120.1–120.5

[56] References Cited

U.S. PATENT DOCUMENTS 1,736,262   11/1929   Hanel .................................. 100/199

FOREIGN PATENT DOCUMENTS 1322942 of 1963 France ............................. 99/571

Primary Examiner—Harvey C. Hornsby
Assistant Examiner—Timothy F. Simone
Attorney, Agent, or Firm—James D. Givnan, Jr.

[57] ABSTRACT

A base having a lengthwise extending opening within which are received a number of slidably mounted plate members each spring urged to spaced apart relationship with an adjacent plate member to enable placement of a nut to be cracked thereon. Inserts for each plate member limit closing movement therebetween to prevent crushing of the nut. A lever imparts closing, nut cracking movement to the plate members. Each plate member is recessed to receive the spring ends and further recessed to receive the movement limiting inserts.

6 Claims, 6 Drawing Figures

NUTCRACKER

BACKGROUND OF THE INVENTION

The present invention relates generally to devices for cracking nuts and particularly to such a device for simultaneously cracking several nuts.

To the extent the prior art is known, two general types of nut cracking devices are known. One such class being those nutcrackers for individual cracking a nut and those nutcrackers for use on a commercial scale which operate in a continuous manner. A drawback to the former type of nutcracker is the time consuming operation involving the placement of a nut therein, the cracking of same and the removal of the shell fragments and nut meat from nutcracker. The second type of nut cracking devices is clearly not adaptable for use in the home by reason of size and cost but rather are limited to commercial uses.

SUMMARY OF THE PRESENT INVENTION

The present invention is embodied within a nutcracker capable of cracking several nuts in one operation.

The instant nutcracker includes a base structure within which are slidably disposed series of spaced apart plate members each receiving a nut thereon for cracking during closing movement of the plate members. Limit means on each of the plate members restricts closing movement of same to prevent mashing of the nut meat. Resilient members are disposed intermediate each of the plate members to bias same to an open, nut receiving position. The limit means are removably mounted on each plate member so as to permit use of a nutcracker in the cracking of various species or sizes of nuts. Guide means intermediate on said plate members and said base assure desired closing and opening movement of said plate members.

Objects of the present invention include the provision of a nutcracker adapted for domestic use within the home yet having the capability of cracking several nuts during one operation; the provision of a nutcracker capable of cracking several nuts during one operation which nuts may be of different sizes and shapes; the provision of a nutcracker having a series of slidable plates therein which open and close during a nutcracking operation in response to manually exerted forces; the provision of a nutcracker of a design lending itself to low cost, mass production type fabrication to provide a nutcracker of low manufacture cost.

DETAILED DESCRIPTION OF THE PREFERRED EMBODIMENT

Figure 1:
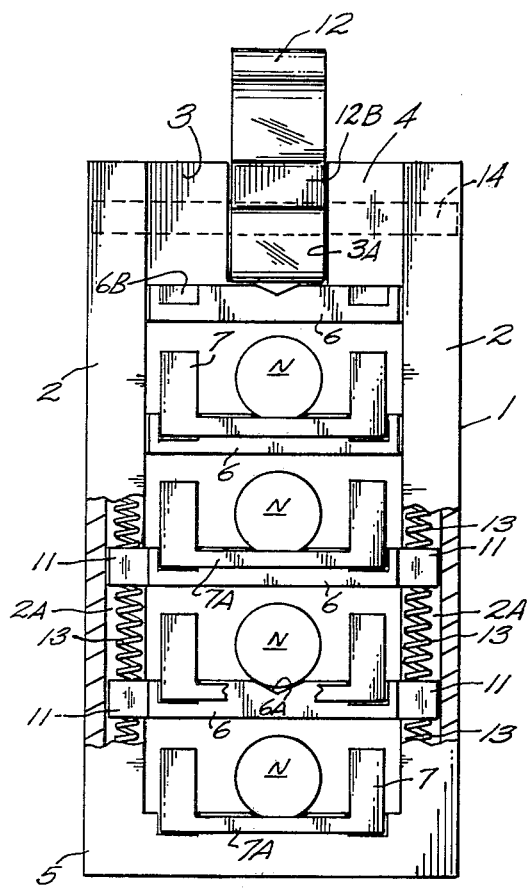
FIG. 1 is a front elevational view of the present nutcracker with fragments broken away to disclose internal details.
Figure 2:
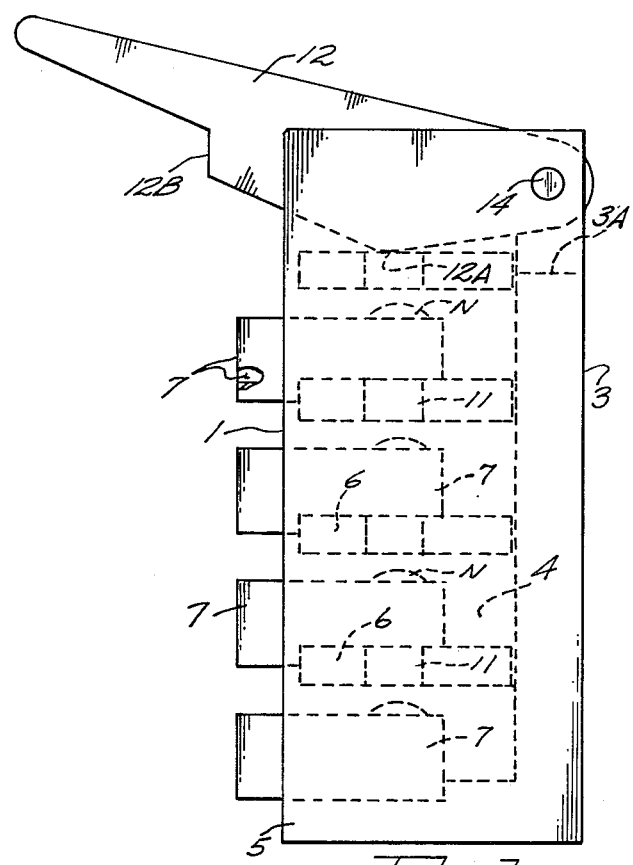
FIG. 2 is a side elevational view of FIG. 1.
Figure 3:
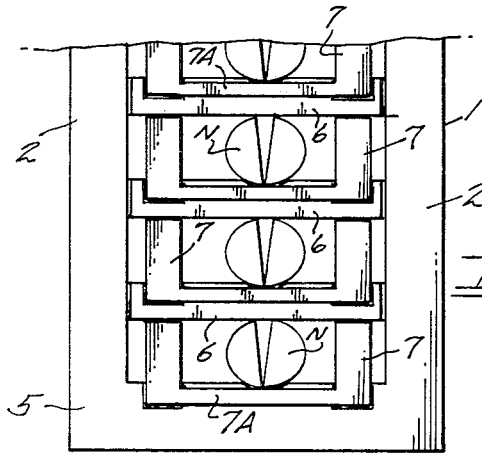
FIG. 3 is a fragmentary front elevational view of the nutcracker with the plate members closed in nutcracking relationship.
Figure 5:
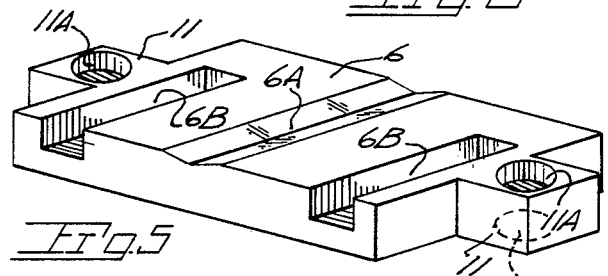
FIG. 5 is a perspective view of a typical plate member.

With continuing attention to the drawing, the reference numeral 1 indicates a base of the nutcracker including sidewall 2, and a back wall 3 jointly defining a lengthwise orientated base opening 4. A bottom wall is indicated at 5.

Figure 6:
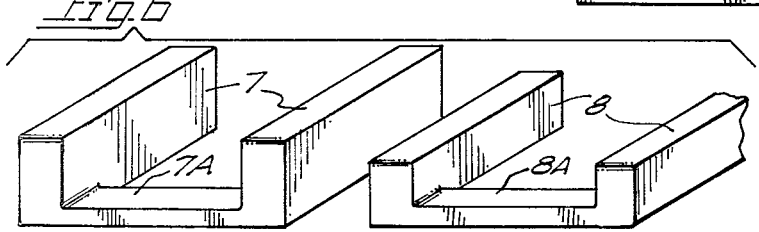
FIG. 6 is an isometric view of a collection of spacers for the present nutcracker.

Slidably disposed within said opening 4 are a series of plate members 6 each recessed at 6A to receive a nut to be cracked. Each plate member is further recessed at 6B to receive limit means in the form of interchangeable spacers or inserts 7 and 8 as best shown in FIG. 6, for the purpose of limiting the extent of closing movement between adjacent plate members. Each spacer is preferably of U-shaped configuration having a crossmember 7A, 8A.

Figure 4:
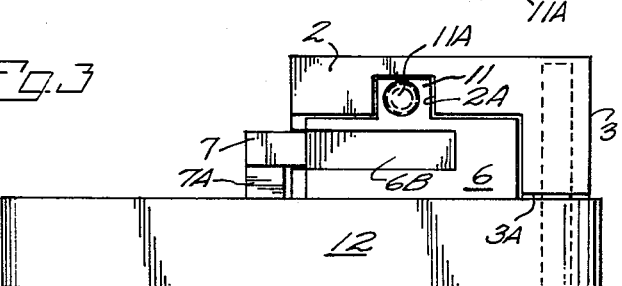
FIG. 4 is a plan view of FIG. 2.

Guide means are provided on each of said plate members and said sidewalls for the purpose of assuring desired opening and closing movement of the plate members relative to one another. The sidewalls 2 are grooved at 2A, as best shown in FIG. 4, to slidably receive guide members 11 formed on each of said plate members. The guide members are provided with recesses 11A on their top and bottom surfaces to receive the ends of spring components 13 which urge the plate members to their spaced apart positions (FIG. 1) for the reception of the nuts to be cracked.

For imparting nut cracking forces to each of the plate members 6, I provide a lever 12 swingably mounted at one end by means of a pin 14 extending through a lever receiving opening 3A in back wall 3. A lower curved surface 12A of the lever bears upon an uppermost plate member to bias same downwardly during a nut cracking operation. A finger guard is provided by a shoulder 12B of the lever which prevents finger contact with base 1.

In a nut cracking operation, the nutcracker plates are automatically spaced apart to receive inserted nuts at N. Subsequent downward pressure on lever 12 causes a sequential advancement of each plate member 6 toward a subjacent plate member during which the underside of the plate member is brought into contact with the nut to be cracked. The extent of closing movement between plate member 6 is limited by the spacers of the type indicated at 7 and 8. The size of spacer used is determined by the nut size being cracked, for example, the larger spacer 7 may be used in the cracking of large nuts such as walnuts as same permits adequate closing movement between plate members while preventing excessive crushing and damaging of the nut meat. The springs 13 collapse during such plate member closing movement and automatically repositions the plate members apart upon release of lever 12.

While I have shown but a few embodiments of the invention it will be apparent to those skilled in the art that the invention may be embodied still otherwise without departing from the spirit and scope of the invention.

Having thus described the invention, what is desired to be secured under a Letters Patent is:

1. A nutcracker comprising in combination,
    a base having a lengthwise orientated opening,
    a series of spaced apart plate members slidably disposed in said opening to receive a nut thereon,
    resilient means acting on said plate members urging same to a spaced apart relationship, guide means embodied on said base and each of said plate members, a lever pivotally attached at one of its ends to the upper end of said base for imparting a nut cracking force to a subjacent plate member and in a sequential manner to each of the remaining plate members, and limit means carried by said plate members and limiting closing movement between plate members, said limit means also serving to transfer nut cracking forces from one plate member to another.

2. The nutcracker claimed in claim 1 wherein said limit means are detachably mounted on said plate members.

3. The nutcracker claimed in claim 2 wherein said limit means may be of different vertical dimensions to regulate the extent of closing movement between plate members.

4. The nutcracker claimed in claim 3 wherein each of said plate members defines a recessed area for nut reception.

5. The nutcracker claimed in claim 4 wherein said plate members each further defines parallel inset areas for inserted reception of said limit means.

6. The nutcracker claimed in claim 5 wherein said limit means are each of U-shape configuration.

* * * * *